United States Patent [19]

Motoki et al.

[11] Patent Number: 5,214,141
[45] Date of Patent: May 25, 1993

[54] AZOMETHINE COMPOUND AND PHOTOGRAPHIC DYE COMPRISING THE AZOMETHINE COMPOUND

[75] Inventors: Masuji Motoki; Naoki Saito; Takayoshi Kamio; Mitsugu Tanaka; Seiji Ichijima, all of Minami-ashigara, Japan

[73] Assignee: Fuji Photo Film Co., Ltd., Kanagawa, Japan

[21] Appl. No.: 815,162

[22] Filed: Dec. 31, 1991

[30] Foreign Application Priority Data

Jan. 18, 1991 [JP] Japan ............... 3-16842

[51] Int. Cl.⁵ ............... G03G 5/00; G03G 15/06; C07D 265/36; C07D 498/02
[52] U.S. Cl. ............... 544/105; 430/76; 430/78; 430/82; 430/351; 544/162; 544/168; 546/168; 546/192; 546/206; 546/234; 548/493; 548/495; 548/530; 548/540; 548/567; 548/568; 560/20; 560/21; 560/22; 564/147; 564/163; 564/168; 564/209
[58] Field of Search ............... 534/648; 564/147, 168, 564/163, 181; 544/162, 105, 168; 546/168, 192, 206, 234; 548/493, 540, 495, 530, 567, 568

[56] References Cited

U.S. PATENT DOCUMENTS

| | | | |
|---|---|---|---|
| 2,264,123 | 11/1941 | Schmitt et al. | 548/493 |
| 2,694,718 | 11/1954 | Salminen et al. | 534/648 X |
| 3,068,236 | 12/1962 | Krapcho | 548/568 X |
| 3,141,024 | 7/1964 | Houssin | 548/540 |
| 3,265,506 | 8/1966 | Weissberger et al. | 564/163 X |
| 3,384,657 | 5/1968 | Weissberger et al. | 564/163 X |
| 3,558,700 | 1/1971 | Kimura et al. | 534/648 |
| 3,790,633 | 2/1974 | Jedlicka | 564/163 X |
| 3,928,312 | 12/1975 | Fleckenstein | 534/648 |
| 4,503,232 | 3/1985 | Kobayashi et al. | 548/495 X |

FOREIGN PATENT DOCUMENTS

| | | | |
|---|---|---|---|
| 57-80367 | 5/1982 | Japan | 548/495 |
| 57-80368 | 5/1982 | Japan | 548/495 |

*Primary Examiner*—Floyd D. Higel
*Attorney, Agent, or Firm*—Birch, Stewart, Kolasch & Birch

[57] ABSTRACT

The present invention relates to an azomethine compound represented by formula (I):

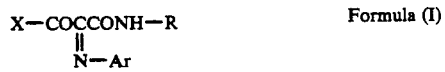

wherein X represents a 5- or 6-membered cyclic amino group, R represents an aromatic group, and Ar represents an aromatic group having an aliphatic amino group in the para-position. The azomethine compounds disclosed are useful yellow dyes for photography, for various optical filters, for ink jet, for heat transfer printing, and for printing.

23 Claims, 2 Drawing Sheets

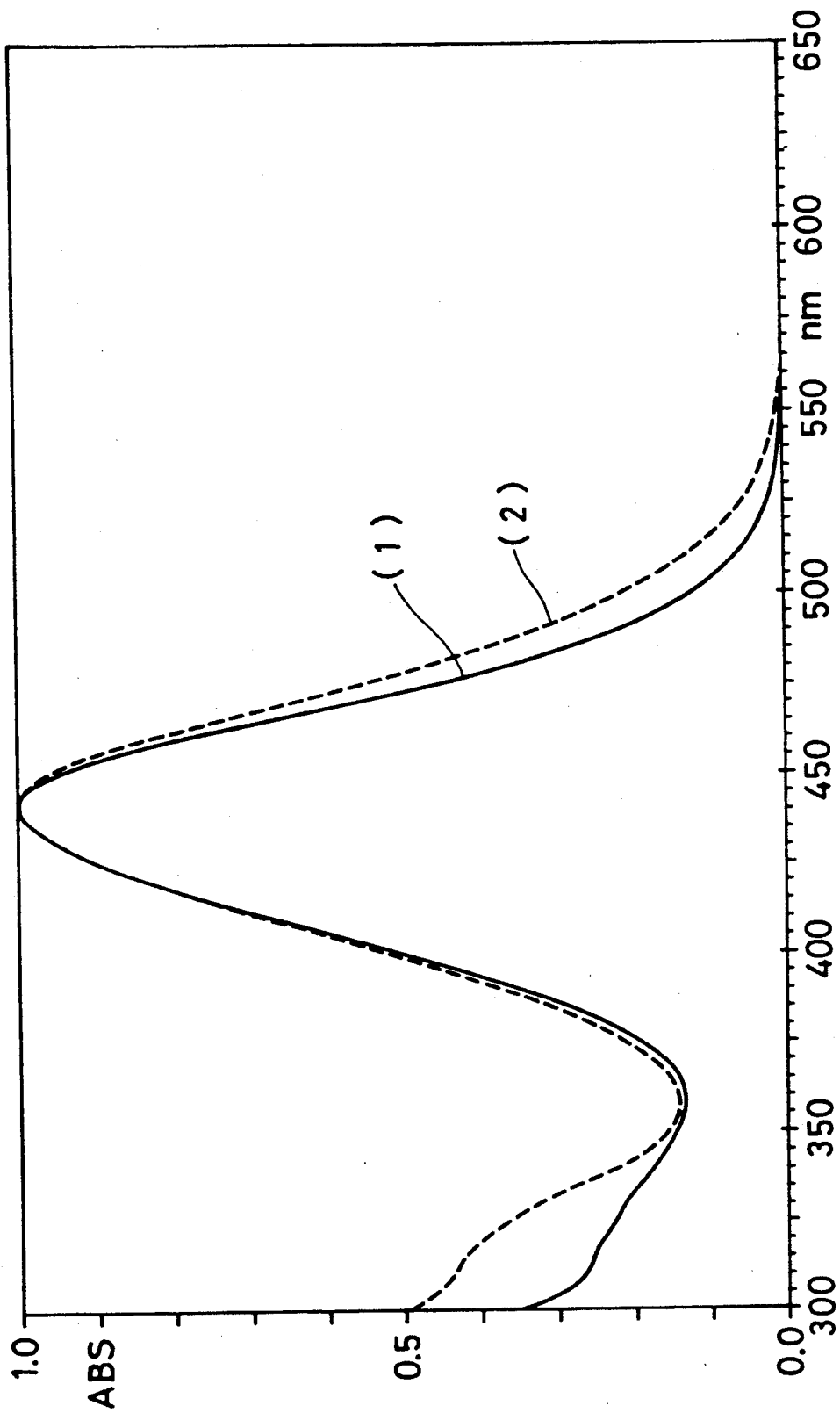

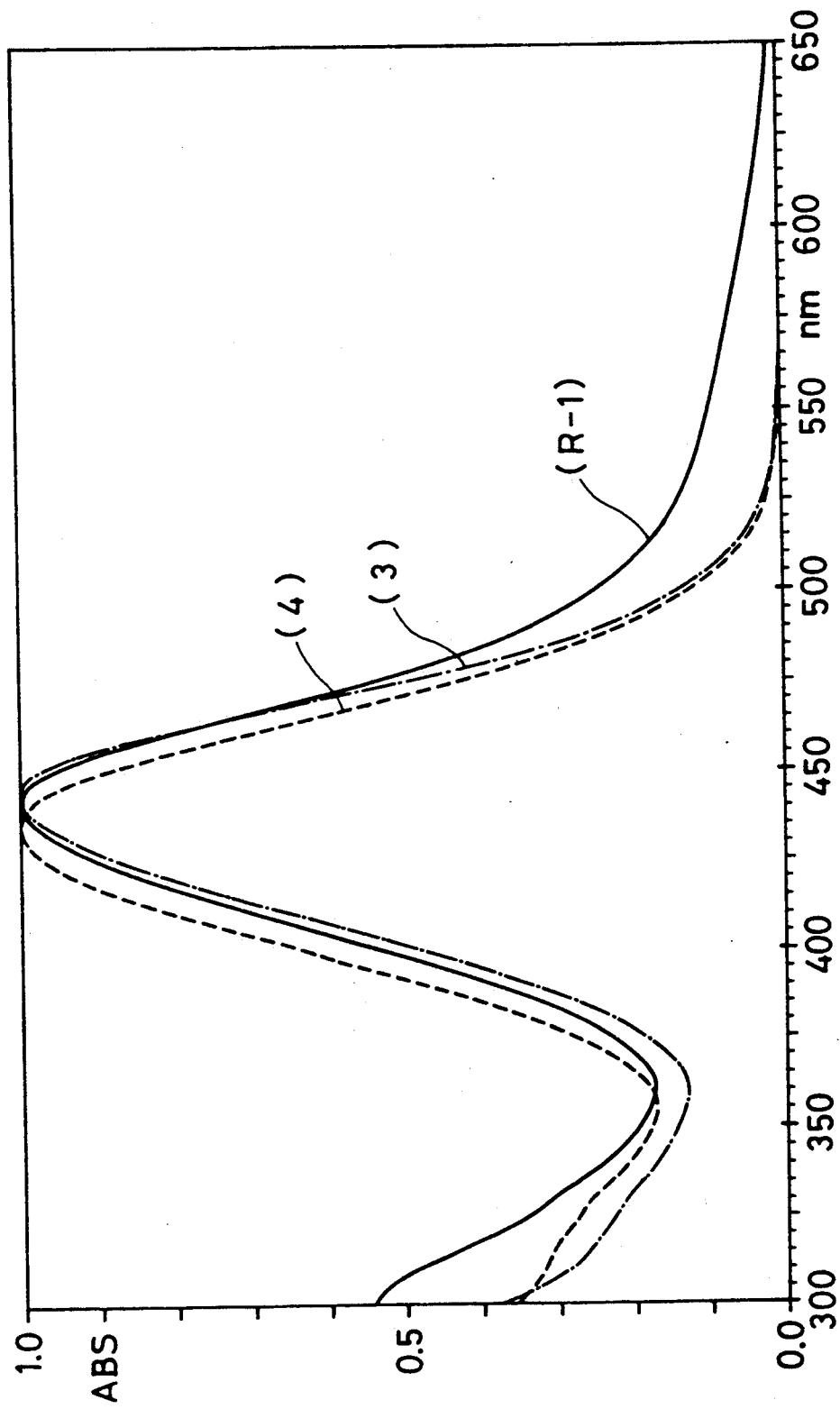

AZOMETHINE COMPOUND AND PHOTOGRAPHIC DYE COMPRISING THE AZOMETHINE COMPOUND

FIELD OF THE INVENTION

The present invention relates to azomethine compounds, and more particularly to azomethine compounds useful as yellow dyes that are excellent in spectral absorption characteristics and are less decomposable upon exposure, for example, to heat-and-humidity and light, and thereby are excellent in stability.

BACKGROUND OF THE INVENTION

Yellow dyes are conventionally used in various fields, for example as dyes for photography, dyes for ink jet, dyes for printing, and dyes for optical filters. Although the performance requirement of yellow dyes differ a little from case to case, their basic performance requirement is to be excellent in spectral absorption characteristics and fast, for example, to heat-and-humidity and light.

Conventionally, as an example of azomethine yellow dyes, a dye synthesized by an oxidation coupling reaction between malondianilide and paraphenylenediamine is known (see, for example, British Patent No. 1,204,680 and Japanese Patent Publication No. 47379/1980).

However, conventionally known azomethine dyes obtained from malondianilide have a problem in that their stability to heat-and-humidity and light is low. Further, the decrease of absorbance at the foot part in the long wavelength side is not sharp, so that these dyes appear orange to brown, and therefore they are not satisfactory from a practical point of view as yellow dyes.

SUMMARY OF THE INVENTION

Therefore, the object of the present invention is to provide azomethine compounds useful as yellow dyes that are excellent in spectral absorption characteristics and less decomposable upon exposure, for example, to heat-and-humidity and light and thereby are excellent in stability.

Another object of the present invention is to provide a yellow dye that is useful for photography, for optical filter, for ink jet, for heat transfer printing, for printing, and the like.

The above and other objects, features, and advantages of the invention will become apparent from the detailed description taken in conjunction with the accompanying drawings.

BRIEF DESCRIPTION OF THE DRAWINGS

FIG. 1 is the absorption spectra of Exemplified Compounds (1) and (2).

FIG. 2 is the absorption spectra of Exemplified Compounds (3) and (4) and Comparative Compound (R-1).

In these figures, the abscissa represents wavelength (nm) and the ordinate represents relative absorbance.

DETAILED DESCRIPTION OF THE INVENTION

The inventors have studied to overcome the faults of azomethine dyes and have found that azomethine compounds having a specific cyclic amino group in their structure meet the object, leading to the present invention.

In accordance with the present invention there is provided an azomethine compound represented by the following formula (I):

Formula (I)

wherein X represents a 5- or 6-membered cyclic amino group, R represents an aromatic group, and Ar represents an aromatic group having an aliphatic amino group in the para-position.

The compounds represented by formula (I) will now be described in detail below.

The 5- or 6-membered cyclic amino group represented by X may contain, in addition to the nitrogen atom and the carbon atoms, an oxygen atom and a sulfur atom as ring-constituting atoms; it may be a monocyclic ring or a condensed ring; it may be substituted or unsubstituted; and it may be saturated or unsaturated. As specific examples of the cyclic amino group, a 1-indolinyl, a morpholino, a 1,2,3,4-tetrahydroquinolin-1-yl, a pyrrolidino, a benzomorpholino, a 1-pyrrolinyl, or a 1-piperidinyl group can be mentioned. Preferably X represents a 5-membered cyclic amino group.

The aromatic group represented by R is preferably a phenyl group. Particularly preferably R represents a phenyl group having a substituent in the ortho-position.

Preferably the aromatic group represented by Ar is a phenyl group whose para-position is substituted by an aliphatic amino group. Preferably the aliphatic amino group is an aliphatic amino group having at least one alkyl group, more preferably two alkyl groups, preferably with 1 to 10 carbon atoms, more preferably with 1 to 5 carbon atoms. Examples of such a substituent are a diethylamino group and a dimethylamino group. Particularly preferably Ar is a phenyl group whose para-position is substituted by an aliphatic amino group and whose ortho-position is substituted by an aliphatic group (having 1 to 5 carbon atoms, preferably 1 to 2 carbon atoms, such as methyl and ethyl).

The above-mentioned cyclic amino groups, aromatic groups, and aliphatic groups may be further substituted.

If they have substituents, typical examples of the substituents include a halogen atom (e.g., fluorine, chlorine, and bromine), an alkoxycarbonyl group (having 2 to 30 carbon atoms, preferably 2 to 20 carbon atoms, e.g., methoxycarbonyl and dodecyloxycarbonyl), an acylamino group (having 2 to 30 carbon atoms, preferably 2 to 20 carbon atoms, e.g., acetamido and tetradecaneamido), a sulfonamido group (having 1 to 30 carbon atoms, preferably 1 to 20 carbon atoms, e.g., methanesulfonamido and dodecanesulfonamido), a carbamoyl group (having 1 to 30 carbon atoms, preferably 1 to 20 carbon atoms, e.g., N-dodecylcarbamoyl), a sulfamoyl group (having 1 to 30 carbon atoms, preferably 1 to 20 carbon atoms, e.g., N-phenylsulfamoyl and N-dodecylsulfamoyl), an N-sulfonylsulfamoyl group (having 1 to 30 carbon atoms, preferably 1 to 20 carbon atoms, e.g., N-mesylsulfamoyl and N-dodecanesulfonylsulfamoyl), an alkoxy group (having 1 to 30 carbon atoms, preferably 1 to 20 carbon atoms, e.g., methoxy and ethoxy), a sulfonyl group (having 1 to 30 carbon atoms, preferably 1 to 20 carbon atoms, e.g., methanesulfonyl, benzenesulfonyl, and dodecanesulfonyl), a phenoxy group, a nitro group, a cyano group, a carboxyl group, a hydroxyl group, a sulfo group, an N-acylsulfamoyl group (having 2 to 30 carbon atoms, preferably 2 to 20 carbon atoms, e.g., N-propanoylsulfamoyl and N-tetradecanoylsulfamoyl), or an alkyl group (which may be a linear or branched and saturated or unsaturated alkyl group having 1 to 30 carbon atoms, preferably 1 to 20 carbon atoms, e.g., methyl, ethyl, t-pentyl, and t-butyl). These substituents may further be substituted, for example, by those mentioned here.

Preferably the compounds of the present invention are used as compounds for photography. That is, they are used, for example, as dyes for dyeing photographic layers, dyes for filters, dyes for forming images, dyes for masking, or dyes for improving the adaptability to printers. Further, the compounds of the present invention are preferably used as a heat transfer dye for a heat transfer dye-donating material.

When the dye of the present invention is used for photography, the most preferable example is the case wherein the dye has a nondiffusible group. The term "a nondiffusible group" refers to a group for immobilizing the particular compound in the photographic layer, such a group as is used in coupler compounds generally in the field of photographic chemistry. Generally use is made of an organic group that makes the molecular weight large enough, and preferable examples are an alkyl group having 8 to 30 carbon atoms, preferably 10 to 20 carbon atoms, in all, and a substituted aryl group having 4 to 20 carbon atoms in all. The nondiffusible group may be substituted in any position of the particular molecule, and several such nondiffusible groups may be present.

Specific examples of the compound of the present invention are given below, but the present invention is not restricted to them.

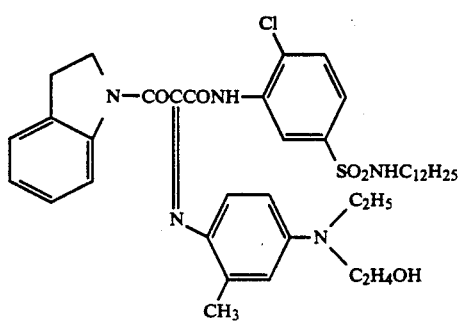

(1)

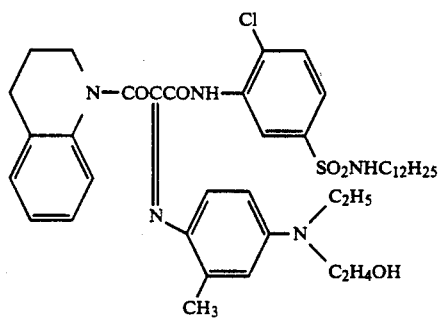

(2)

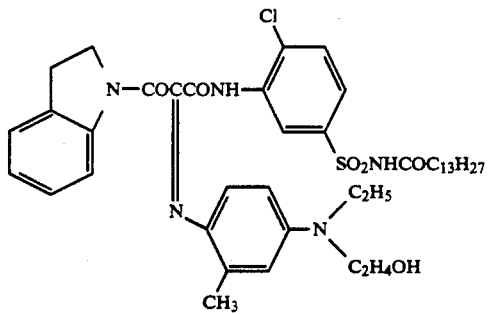

(3)

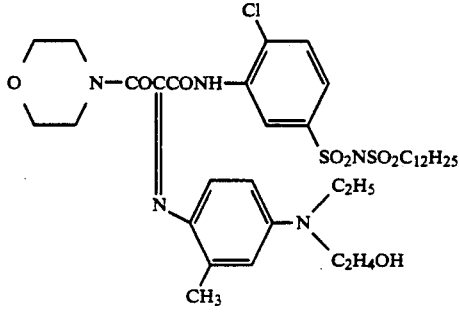

(4)

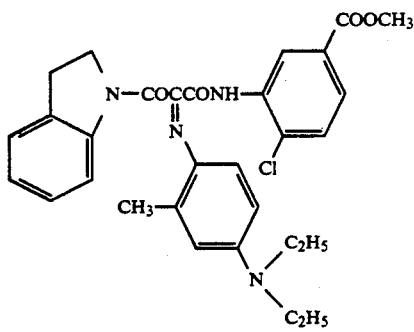 (5)
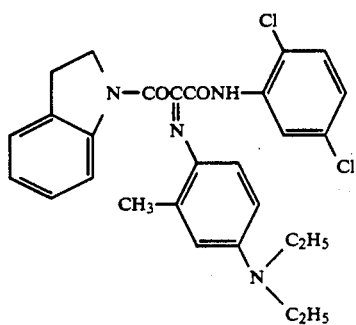 (6)
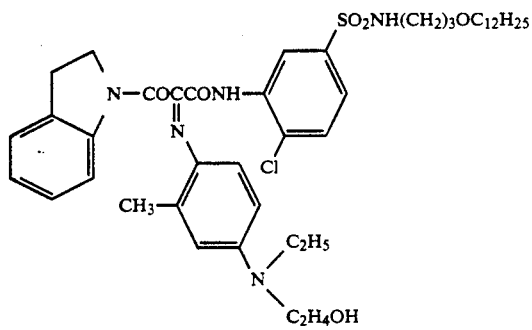 (7)
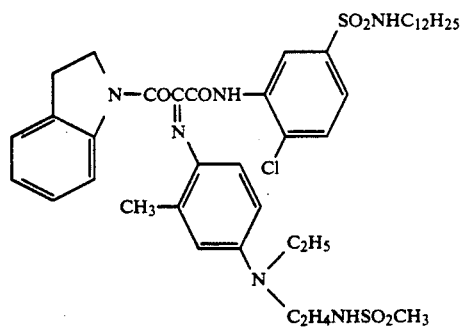 (8)
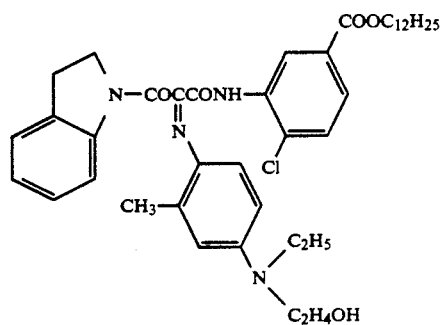 (9)

-continued
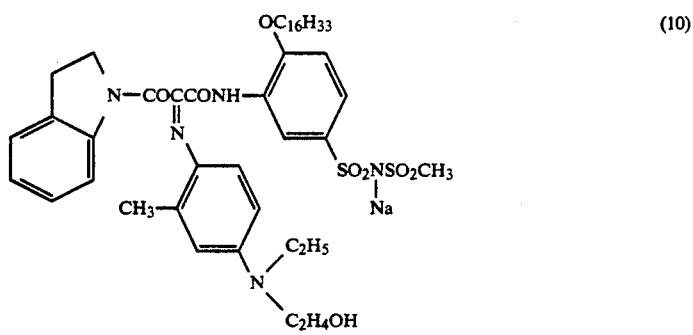
(10)
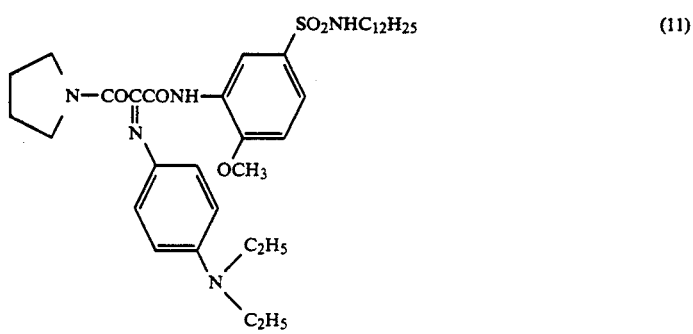
(11)
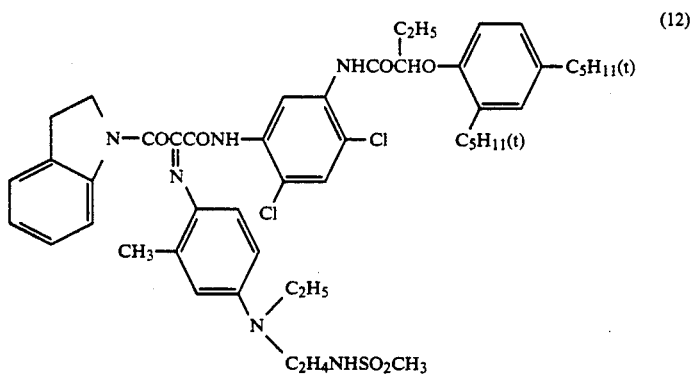
(12)
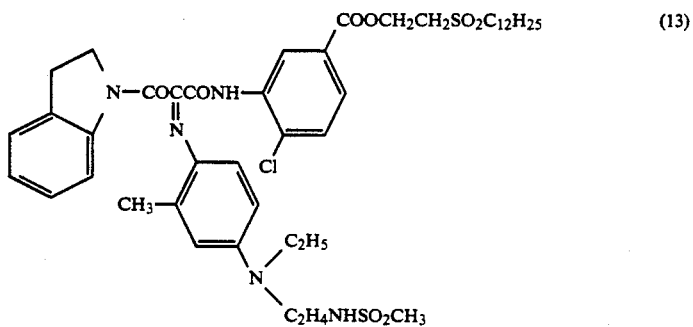
(13)

-continued
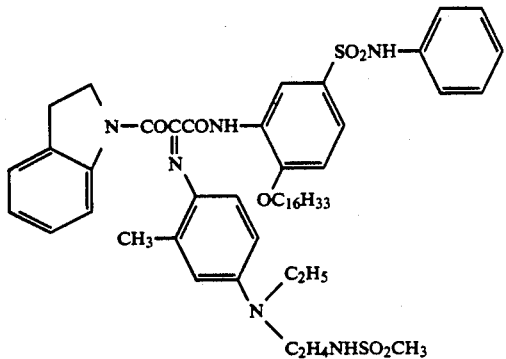
(14)
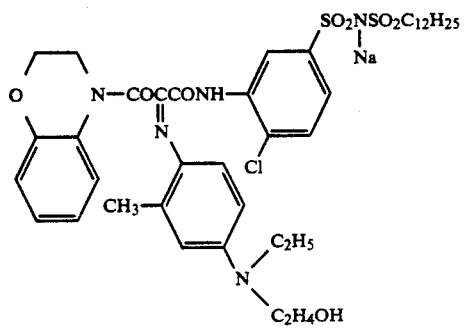
(15)
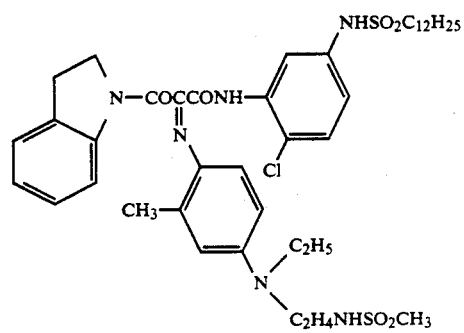
(16)
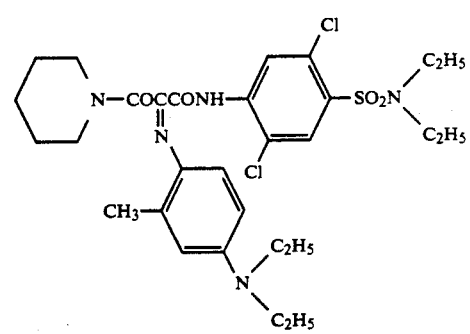
(17)
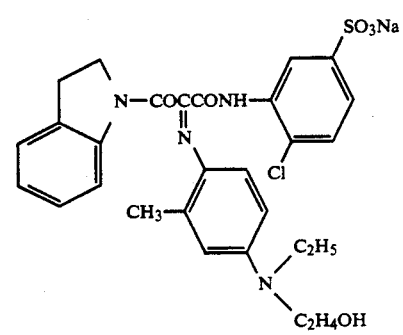
(18)

-continued
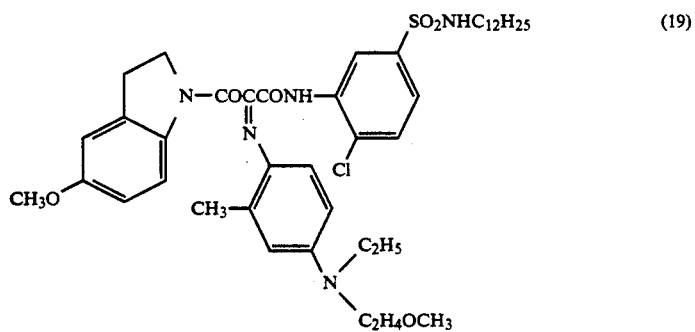
(19)
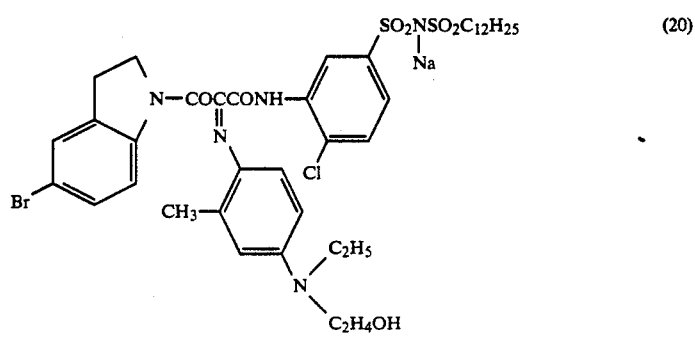
(20)
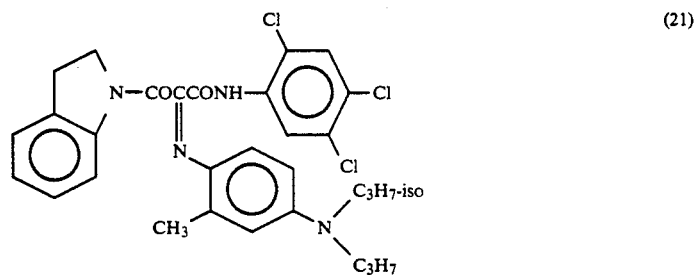
(21)
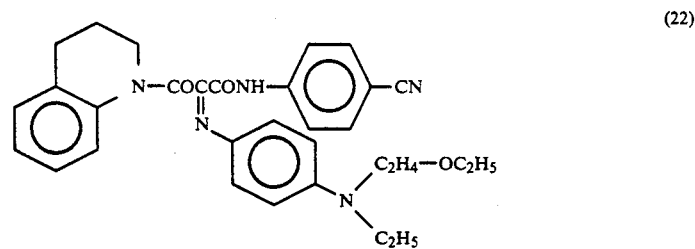
(22)
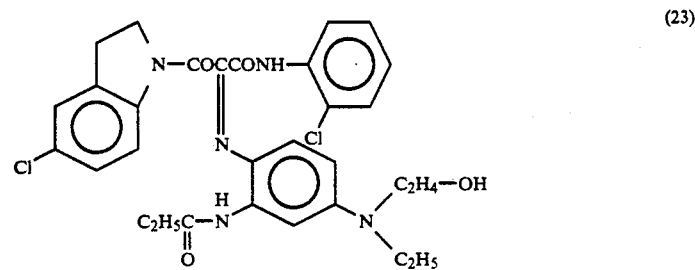
(23)

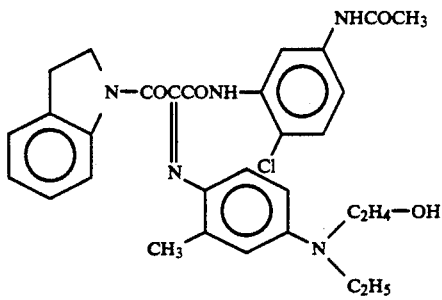

(24)

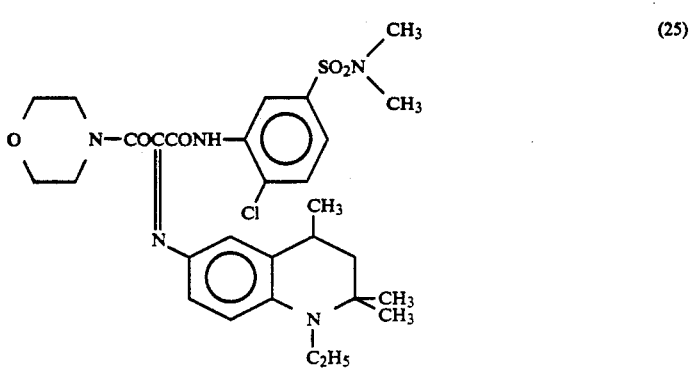

(25)

Now, processes for synthesizing compounds of the present invention will be described.

For example, the synthesis is carried out through the following synthesis route:

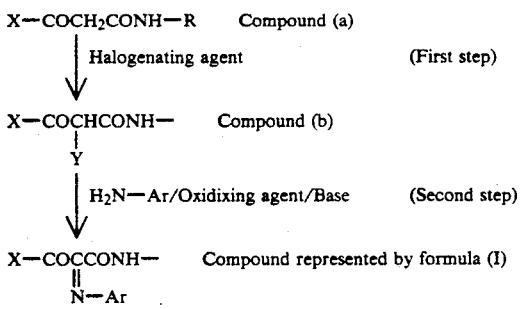

wherein X, R, and Ar have the same meanings as defined in formula (I) and Y represents a halogen atom.

In the foregoing, as the halogenating agent, for example, bromine, chlorine, sulfuryl chloride, N-bromosuccinimide, or N-chlorosuccinimide is used.

As the oxidizing agent, for example, ammonium persulfate, potassium persulfate, ferric chloride, hydrogen peroxide, a silver halide, perbenzoic acid, or peracetic acid is used.

Generally the reaction in the above second step is carried out in the presence of a base. As the base, any of inorganic bases and organic bases may be used. For example, use is made of sodium carbonate, potassium carbonate, sodium hydroxide, potassium hydroxide, triethylamine, sodium acetate, sodium methoxide, or ammonia water.

In the first step, as the reaction solvent, a halogenated hydrocarbon solvent (e.g., methylene chloride, chloroform, and methylchloroform) is useful. In the second step, as the reaction solvent, an amide solvent (e.g., N,N-dimethylformamide, N,N-dimethylacetamide, and N-methylpyrrolidone), a nitrile solvent (e.g., acetonitrile), an ether solvent (e.g., tetrahydrofuran, ethylene glycol diethyl ether, and propylene glycol monomethyl ether) a sulfone solvent (e.g., dimethylsulfone and sulfolane), an alcohol solvent (e.g., ethanol, methanol, and isopropanol), water, or an ester solvent (e.g., ethyl acetate and butyl acetate) is used. These reaction solvents may be used as a mixture of two or more, and the reaction may be carried out in a two-layer system.

Besides the above synthesis route, for example, Y of the compound (b) in the second step may be converted to Z, mentioned below, and a third step (in this case the third step performs the same reaction as that in the above second step) may be carried out to derive a compound represented by formula (I). As the group represented by Z here, a group capable of being released upon a coupling reaction that is generally used is useful. As a specific example of the group represented by Z, a benzotriazolyl group, a 2,4-dioxo-1,3-imidazolidin-3-yl group, a 2,4-dioxo-1,3-oxazolidin-3-yl group, or a phenoxy group can be mentioned. The reaction wherein Y is converted to Z is generally carried out in the presence of a base in addition to H-Z. As specific examples of the base, the same bases mentioned above can be mentioned. Preferably, the base used herein includes triethylamine, diisopropylethylamine, tetramethylguanidine, potassium hydroxide, potassium carbonate, potassium t-butoxide, sodium hydroxide, sodium methoxide, or pyridine. The reaction solvent is selected suitably from those mentioned above.

The azomethine compound of the present invention represented by formula (I) can be produced by subjecting a compound (b) and an aromatic primary amine, such as an aromatic primary amine represented by formula (II) given below to an oxidation coupling as described above.

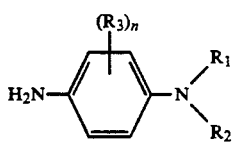

wherein $R_1$ and $R_2$, which may be the same or different, each represent a hydrogen atom or an optionally substituted alkyl group, and at least one of $R_1$ and $R_2$ represents an alkyl group, $R_3$ represents a halogen atom or an optionally substituted alkyl group, n is the number of substituents on $R_3$ and is 0, 1, or 2, and when n is 2, groups $R_3$ may be the same or different.

When the amine represented by formula (II) is used in the form of the salt of a mineral acid or an organic acid, it is readily prevented from being oxidized with air and the speed of the dissolution can be improved.

Preferably $R_1$ and $R_2$ in formula (II) each represent an alkyl group or a substituted alkyl group, such as a hydroxyalkyl group, an alkoxyalkyl group, an alkoxyalkoxyalkyl group, and an alkylsulfonamidoalkyl group.

Preferably, $R_1$ and $R_2$ are selected from lower alkyl groups or substituted lower alkyl groups, particularly preferably from an ethyl group and substituted ethyl groups. Preferably $R_3$ is in the ortho-position to the amino group, and particularly preferably it is a methyl group.

Examples of the alkyl group and the alkoxy group of the paraphenylenediamine derivative (II) and examples of the alkyl of the substituted alkyl group and the alkyl of the alkoxy group of the paraphenylenediamine derivative (II) may be lower alkyl groups having 1 to 4 carbon atoms, such as methyl, ethyl, n-propyl, iso-propyl, n-butyl, iso-butyl, sec-butyl, and t-butyl and higher alkyl groups having 5 to 18 carbon atoms, such as n-amyl, d1-2-methyl-1-butyl, isoamyl, sec-amyl, t-amyl, n-hexyl, methylamyl, 2-ethylbutyl, n-heptyl, 2-heptyl, 3-heptyl, n-octyl, 2-octyl, 2-ethylhexyl, n-dodecyl, n-octadecyl, and cyclohexyl, inclusive of linear, branched, and cyclic alkyl groups. Examples of halogen are chlorine, bromine, and iodine.

Specific examples of the primary amine (II) used for the synthesis of the present compounds are: those having an N-alkyl group, such as 1) 4-amino-N-ethylaniline,
2) 4-amino-N,N-diethylaniline, and
3) 4-amino-3-methyl-N,N-diethylaniline, those having an N-hydroxyalkyl group, such as 4) 4-amino-N-ethyl-N-($\beta$-hydroxyethyl)aniline, and
5) 4-amino-3-methyl-N-ethyl-N-($\beta$-hydroxyethyl)aniline, those having an N-alkoxyalkyl group, such as 6) 4-amino-3-methyl-N-ethyl-($\beta$-methoxyethyl)aniline,
7) 4-amino-3-methyl-N-ethyl-N-methoxybutylaniline,
8) 4-amino-3-methyl-N-ethyl-N-($\beta$-ethoxyethyl)aniline,
9) 4-amino-3-propyl-N-ethyl-N-($\beta$-methoxyethyl)aniline,
10) 4-amino-3-propyl-N-ethyl-N-($\beta$-ethoxyethyl)aniline,
11) 4-amino-3-methoxy-N-ethyl-N-($\beta$-methoxyethyl)aniline, and
12) 4-amino-3-methyl-N-ethyl-N-($\beta$-butoxyethyl)aniline, those having an N-alkoxyalkoxyalkyl group, such as 13) 4-amino-3-methyl-N-ethyl-N-($\beta$-($\beta$-methoxyethoxy)ethyl)aniline,
14) 4-amino-3-methyl-N-ethyl-N-($\beta$-($\beta$-ethoxyethoxy)ethyl)aniline,
15) 4-amino-3-methyl-N-ethyl-N-($\beta$-($\beta$-butoxyethoxy)ethyl)aniline,
16) 4-amino-3-methyl-N-methyl-N-($\beta$-($\beta$-ethoxyethoxy)ethyl)aniline,
17) 4-amino-N-ethyl-N-($\beta$-($\beta$-methoxyethoxy)ethyl)aniline, and
18) 4-amino-N-ethyl-N-($\beta$-($\beta$-ethoxyethoxy)ethyl)aniline, and those having an N-alkylsulfonamidoalkyl group, such as 19) 4-amino-N-ethyl-N-($\beta$-methylsulfonamidoethyl)aniline,
20) 4-amino-3-methyl-N-ethyl-N-($\beta$-methylsulfonamidoethyl)aniline,
21) 4-amino-3-chloro-N-ethyl-N-($\beta$-methylsulfonamidoethyl)aniline, and
22) 4-amino-N-ethyl-($\beta$-methylsulfonamidoethyl)-3,5-xylidine.

Examples of salts of those are mineral acid salts of the above-described phenylenediamine derivatives, such as inorganic acid salts, for example hydrohalides, e.g., hydrochlorides, hydrobromides, and hydroiodides, sulfates, nitrates, phosphates, and carbonates; and organic acid salts, such as formates, acetates, salts of aliphatic carboxylic acids, such as propionic acid, aromatic carboxylates, such as benzoates, naphthalene-$\alpha$-carbonates, and naphthalene-$\beta$-carbonates, aliphatic sulfonates, such as methanesulfonates, naphthalene-$\alpha$-sulfonates, naphthalene-$\beta$-sulfonates, and p-toluenesulfonates. Preferably these are selected suitably according to the production conditions of the compound of the present invention, and when they are used as photographic color-developing agents, those that do not adversely influence the photographic properties are preferably selected. Therefore, generally, they are used in the form of a mineral acid salt, such as a sulfate, or an aromatic sulfonate, such as a p-toluenesulfonate.

As paraphenylenediamines used in the present invention, specifically exemplified compounds 3), 5), 6), 19), and 20) mentioned above are particularly preferable, in that they give particularly good hue. The substituent in the 3-position is useful for adjusting the coupling speed, and in the case of an electron-attractive group, such as a chlorine atom, the coupling speed is increased, while in the case of an electron-donative substituent, such as a methyl group, the coupling speed is decreased.

The compounds of the present invention exhibit excellent hue. In particular, the compounds of the present invention are good in the decrease at the foot part in the long wavelength side, which is important for yellow dyes, and they are suitable, for example, for color photographic materials wherein color reproduction is regarded as important, as dyes for various optical filters, as dyes for ink jet, as dyes for heat transfer printing, and as dyes for printing. Further, the compounds of the present invention are suitable for the application stated above because they are fast to heat-and-humidity and light. When X is a 5-membered cyclic amino group, the molar extinction coefficient of the dye is high and the compound is particularly useful.

Now the present invention will be described in detail with reference to the following Examples.

EXAMPLE 1

Synthesis of Exemplified Compound (1)

The following synthesis route was followed.

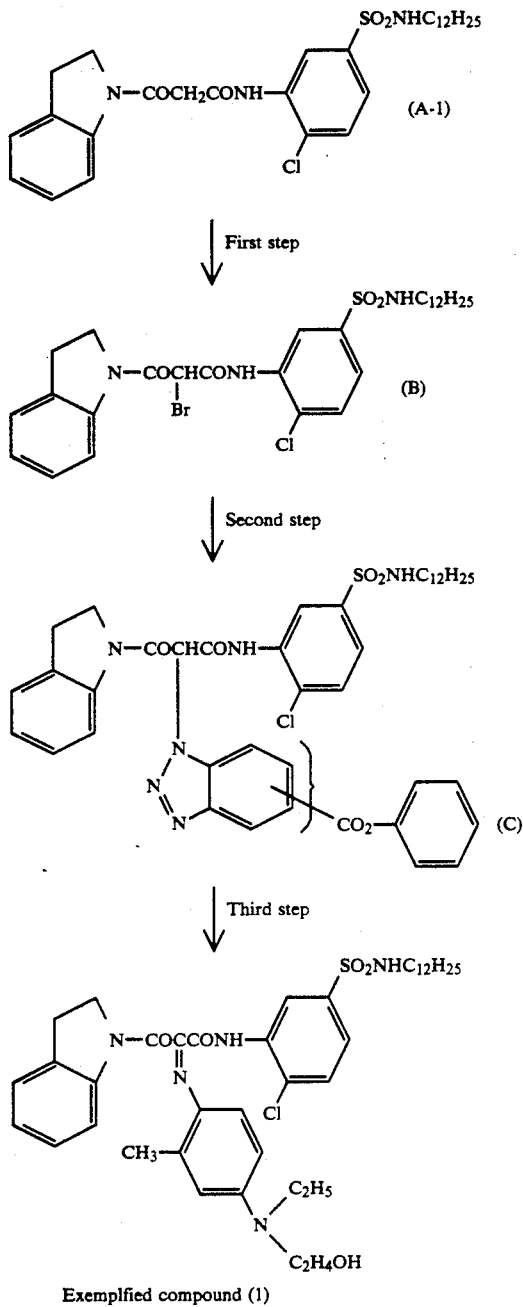

Exemplfied compound (1)

The First Step: Synthesis of Intermediate Compound (B)

16 g of Compound (A-1) was mixed with 150 ml of dichloromethane. 10 ml of a solution of 4.8 g of bromine in dichloromethane was added dropwise under cooling with ice (5° to 10° C.). After the reaction was carried out for 10 min, the reaction mixture was transferred into a separating funnel and was washed with water. The organic layer (a solution containing Compound (B)) was separated and was used in the next step as it was.

The Second Step: Synthesis of Intermediate Compound (C)

15 g of phenoxycarbonylbenzotriazole and 8.8 ml of triethylamine were added to 160 ml of N,N-dimethylformamide. To this solution, the solution of (B) in dichloromethane obtained in the above step was added dropwise at room temperature while stirring. After the reaction was carried out for 1 hour, 500 ml of ethyl acetate was added; then the mixture was transferred into a separating funnel and the organic layer was washed with water. The organic layer was neutralized with diluted hydrochloric acid, washed with water, and separated. The solvent was distilled off under reduced pressure and the residue was separated and purified by column chromatography. As the filler, silica gel was used, and as the eluent, ethyl acetate/hexane (1/1) was used. The fraction containing Intermediate Compound (C) was collected and the solvent was distilled off under reduced pressure, to obtain 17.6 g of Intermediate Compound (C) in a waxy state.

The Third Step: Synthesis of Exemplified Compound (I)

3.9 g of (C) obtained in the previous step was dissolved in a mixed solvent of 40 ml of ethanol and 50 ml of ethyl acetate. To this solution, 4.1 g of sodium carbonate in 30 ml of water was added at room temperature with stirring. To the resulting solution, 1.7 g of 4-{N-ethyl-N-(2-hydroxyethyl)amino}-2-methylaniline sulfate (referred to as D-1) was added. Then, a solution of 1.7 g of ammonium persulfate in 30 ml of water was added dropwise thereto. After the addition the mixture was stirred for 1 hour; then 200 ml of ethyl acetate was added, the mixture was transferred into a separating funnel, and the organic layer was washed with water. After the organic layer was acidified with diluted hydrochloric acid, the organic layer was washed with water twice. The organic layer was separated and the solvent was distilled off under reduced pressure. Then, the residue was purified by column chromatography. As the filler, silica gel was used, and as the eluent, ethyl acetate/hexane (1/1) was used. The fraction containing Exemplified Compound (1) was collected and the solvent was distilled off under reduced pressure, to obtain 2.0 g of Exemplified Compound (1) in a glassy state.

EXAMPLES 2 TO 10

Synthesis of Exemplified Compounds (2) to (10)

Exemplified compounds (2) to (10) were synthesized in the same manner as Example 1, except that materials to be used were changed as shown in Table 1.

TABLE 1

| Example No. | Compound No. synthesized | Material used Coupler part[1] | Aniline part[2] | Remarks (m.p., State) |
|---|---|---|---|---|
| 2 | (2) | (A-2) | (D-1) | Glassy |
| 3 | (3) | (A-3) | (D-1) | Glassy |
| 4 | (4) | (A-4) | (D-1) | Glassy |
| 5 | (5) | (A-5) | (D-2) | m.p.: 196° C.~197° C. |
| 6 | (6) | (A-6) | (D-2) | m.p.: 197° C.~198° C. |
| 7 | (7) | (A-7) | (D-1) | Glassy |
| 8 | (8) | (A-1) | (D-3) | Glassy |
| 9 | (9) | (A-8) | (D-2) | Glassy |
| 10 | (10) | (A-9) | (D-1) | Glassy |

Note:
[1] Raw material used instead of (A-1) used in Example 1. The structural formulae are shown below.
[2] Raw material used instead of (D-1) used in Example 1. The structural formulae are shown below.

(A-1)

TABLE 1-continued

| Example No. | Compound No. synthesized | Material used Coupler part[1] | Aniline part[2] | Remarks (m.p., State) |
|---|---|---|---|---|

(A-2) [structure: indoline-N-COCH₂CONH-phenyl(Cl)(SO₂NHC₁₂H₂₅)]

(A-3) [structure: tetrahydroquinoline-N-COCH₂CONH-phenyl(Cl)(SO₂NHC₁₂H₂₅)]

(A-4) [structure: indoline-N-COCH₂CONH-phenyl(Cl)(SO₂NHCOC₁₃H₂₇)]

(A-5) [structure: morpholine-N-COCH₂CONH-phenyl(Cl)(SO₂NSO₂C₁₂H₂₅·Na)]

(A-6) [structure: indoline-N-COCH₂CONH-phenyl(COOCH₃)(Cl)]

(A-7) [structure: indoline-N-COCH₂CONH-phenyl(Cl)(Cl)]

(A-8) [structure: indoline-N-COCH₂CONH-phenyl(SO₂NH(CH₂)₃OC₁₂H₂₅)(Cl)]

(A-9) [structure: indoline-N-COCH₂CONH-phenyl(Cl)(CO₂C₁₂H₂₅)]

(D-1) [structure: indoline-N-COCH₂CONH-phenyl(OC₁₆H₃₃)(SO₂NSO₂CH₃·Na)]

(D-2) [structure: H₂N-phenyl(CH₃)-N(C₂H₅)(C₂H₄OH)·H₂SO₄]

(D-3) [structure: H₂N-phenyl(CH₃)-N(C₂H₅)(C₂H₅)·H₂SO₄]

[structure: H₂N-phenyl(CH₃)-N(C₂H₅)(C₂H₄NHSO₂CH₃)·H₂SO₄]

EXAMPLES 11 TO 20

Measurement of λmax and ε

In order to make clear the absorption characteristics of the compounds of the present invention as dyes, the absorption characteristics in an ethyl acetate solvent were measured to find the absorption maximum (λmax) and the molecular extinction coefficient (ε) The measured λmax and ε are shown in Table 2.

TABLE 2

| Example No. | Compound No. | λmax(nm) | ε(1·mol⁻¹·cm⁻¹) |
|---|---|---|---|
| 11 | (1) | 442 | 26000 |
| 12 | (2) | 443 | 18000 |
| 13 | (3) | 444 | 26000 |
| 14 | (4) | 435 | 19000 |
| 15 | (5) | 438 | 25000 |
| 16 | (6) | 443 | 26000 |
| 17 | (7) | 442 | 26000 |
| 18 | (8) | 437 | 21000 |
| 19 | (9) | 438 | 25000 |
| 20 | (10) | 434 | 19000 |

EXAMPLE 21

Comparison of Absorption Curves as Optical Filters (Solutions)

In order to make clear the basic properties of compounds of the present invention as optical filters, the absorption spectra in ethyl acetate solutions were compared. As representative compounds of the present invention, (1), (2), (3), and (4) were used. As a comparative compound, (R-1) given below was used. The results (absorption spectra) are given in FIGS. 1 and 2. In the compounds of the present invention, the decrease of absorbance (at the foot part) in the long wavelength side is quite good, and it is apparent that they are good as optical filters. In contrast, in Compound (R-1) for comparison, the decrease at the foot part is poor.

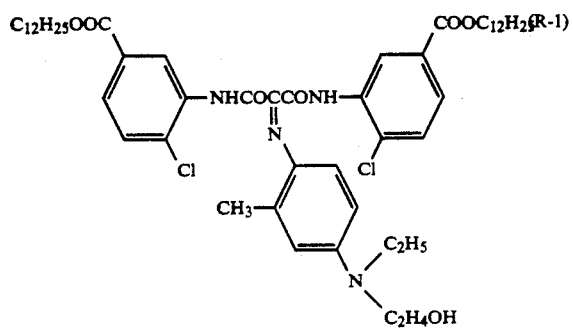

EXAMPLE 22

Evaluation of Stability to Heat-and-Humidity and Light

Sample 22-1 was prepared by coating each layer composition of which is shown below on a triacetyl cellulose film base provided with a prime coating.

| (1) A yellow filter layer | |
|---|---|
| Exemplified compound (1) | 0.20 g/m$^2$ |
| Tricresyl phosphate | 1.00 g/m$^2$ |
| Gelatin | 3.80 g/m$^2$ |
| (2) A protective layer | |
| Sodium 2,4-dichloro-6-hydroxy-s-triazine | 0.10 g/m$^2$ |
| Gelatin | 1.80 g/m$^2$ |

Samples 22-2 to 22-9 were prepared in the same manner as Sample 22-1, except that Exemplified Compound (1) was changed to an other compound of the present invention or comparative compound, respectively. The yellow density was measured and was found to be in the range of 0.45 to 0.55. Then each of the samples was divided in two; after one of the two was allowed to stand for 14 days under conditions of 60° C. and 70% relative humidity, and the other was allowed to stand for 7 days under irradiation by a fluorescent lamp of 20,000 lux, the yellow density of each Sample was measured. The dye-remaining ratios were determined from the percentage of those densities to the densities before the fading test. The results are shown in Table 3.

TABLE 3

| | | Yellow dye-remaining ratio (%) | |
|---|---|---|---|
| Sample No. | Compound No. | Under a forced heat-and-humidity condition | Under a forced light irradiation condition |
| 22-1 | Exemplified compound (1) | 100 | 98 |
| 22-2 | Exemplified compound (2) | 100 | 98 |
| 22-3 | Exemplified compound (3) | 98 | 96 |
| 22-4 | Exemplified compound (4) | 97 | 96 |
| 22-5 | Exemplified compound (5) | 100 | 96 |
| 22-6 | Exemplified compound (6) | 100 | 97 |
| 22-7 | Exemplified compound (7) | 98 | 97 |
| 22-8 | Exemplified compound (8) | 97 | 96 |
| 22-9 | Comparative compound (R-1) | 32 | 21 |

As is apparent from Table 3, it is clear that while the decrease in the yellow density of the Comparative Examples to heat-and-humidity and to light is large, the yellow density of the Samples of the present invention lowers hardly at all and the stability of the compounds is excellent.

On the other hand, it can be understood from these Examples that the compounds of the present invention which have a non-diffusible group can be dissolved in high-boiling organic solvents easily to be dispersed into a gelatin matrix. This method is one technique for dyeing a specific photographic layer in applied coating films of a photographic material. That is, a compound having a non-diffusible group is advantageous in that the compound does not flow out into other layers or into a processing solution in the developing step.

EXAMPLE 23

Heat transfer dye-donating materials containing compounds of the present invention were prepared and tested as follows:

Preparation of Heat Transfer Dye-Donating Material (23-1)

A heat transfer dye-donating layer composition as shown below was applied by an wire-bar coating process on one surface of polyethylene terephthalate film having a thickness of 6 μm, another surface of which had been subjected to a heat resisting and slipping treatment, to give the dry thickness of coatings of 1.5 μm and prepare a heat transfer dye-donating material (23-1).

| Coating composition for heat transfer dye-donating layer: | |
|---|---|
| Dye (5) | 8 mmol |
| Polyvinyl butyral resin (Denka Butyral, made by Denkikagaku Co.) | 3 g |
| Toluene | 40 ml |
| Methyl ethyl ketone | 40 ml |
| Polyisocyanate (Takenate D110N, made by Takeda Chemicals) | 0.2 ml |

Then, heat transfer dye-donating materials (23-2) to (23-5) were prepared in the same manner as the above, except that Dye (5) was changed to other compounds of the present invention and Comparative dye as shown in Table 4.

Preparation of Heat Transfer Image-Receiving Material A

A heat transfer image-receiving layer composition as show below was applied by a wire-bar coating process on a synthetic paper YUPO-FPG-150, made by Ojiyuka) having a thickness of 150 μm, to form coatings the thickness of which is 8 μm, to give a heat transfer image-receiving material. Drying was conducted, after pre-drying by a dryer, in an oven at 100° C. for 30 minutes.

| Coating composition A for image-receiving layer: | |
|---|---|
| Polyester resin (Vylon-280, made by Toyobo) | 22 g |
| Polyisocyanate (KP-90, made by Dainippon Ink Chemicals) | 4 g |
| Amino-modified silicone oil (KP-857, made by Shinetsu Silicone) | 0.5 g |
| Methyl ethyl ketone | 85 ml |
| Toluene | 85 ml |
| Cyclohexanone | 15 ml |

Thus-obtained each of heat transfer dye-donating materials (23-1) to (23-5) and heat transfer image-receiving material A were overlapped each other so as to contact the dye-donating layer with the receiving layer, and printing was conducted using a thermal head on the support side of heat transfer dye-donating material at the following condition:

| Output of thermal head | 0.25 W/dot, |
|---|---|
| Width of puls | 0.15 to 15 msec, |
| Dot density | 6 dot/mm, | to dye and deposit a yellow dye on the receiving layer of heat transfer image-receiving material. As the result, sharp image records having uniformity of transfer were obtained.

Then, each of the thus-obtained recorded heat transfer image-receiving materials was subjected to an irradiation of a fluorescent lamp of 17,000 Lux for 7 days to evaluate the stability of the image dye. The stability was evaluated by the ratio of status A reflective densities before and after the irradiation. Further, each recorded heat transfer image-receiving material was kept in an incubator at 60° C. for 7 days to evaluate the dark-and-heat fastness of the image dye. The fastness was evaluated by the ratio of status A reflective densities before and after the test. Results are shown in Table 4.

TABLE 4

| No. | Dye | Maximum density | Light fastness | Dark-and heat fastness | Remarks |
|---|---|---|---|---|---|
| 23-1 | (5) | 1.4 | 0.92 | 0.98 | This invention |
| 23-2 | (6) | 1.4 | 0.91 | 0.97 | " |
| 23-3 | (21) | 1.3 | 0.93 | 0.99 | " |
| 23-4 | (24) | 1.4 | 0.93 | 0.98 | " |
| 23-5 | a* | 1.3 | 0.79 | 0.93 | Comparative Example |

Note:
*Dye described in Japanese Patent Applicaton (OPI) No. 176591/1989

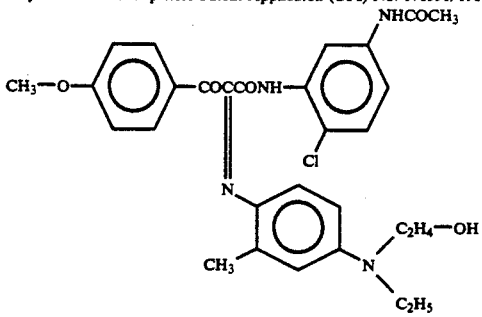

As is apparent from the results in Table 4, the dye of the present invention has both excellent fastnesses to light and to dark-and-heat, compared with the comparative dye.

Having described our invention as related to the present embodiments, it is our intention that the invention not be limited by any of the details of the description, unless otherwise specified, but rather be construed broadly within its spirit and scope as set out in the accompanying claims.

What we claim is:

1. An azomethine compound represented by the following formula:

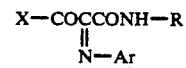

wherein:

X represents substituted or unsubstituted, saturated or unsaturated, 5- or 6-membered monocyclic or condensed ring amino, wherein the members of the ring-constituting atoms are selected from the group consisting of nitrogen atoms, carbon atoms, oxygen atoms, sulfur atoms and combinations thereof, R represents substituted or unsubstituted phenyl, Ar represents substituted or unsubstituted phenyl having alkyl amino with 1 to 10 carbon atoms in the para-position, and the substituents for amino, phenyl, and alkyl are selected from the group consisting of halogen, alkoxycarbonyl, carbonoamido, sulfonamido, carbamoyl, sulfamoyl, N-sulfonylsulfamoyl, alkoxy, sulfonyl, phenoxy, nitro, cyano, carboxyl, hydroxyl, sulfo, N-carbonosulfamoyl and alkyl, said substituents are unsubstituted or further substituted with the substituents listed above.

2. The azomethine compound as claimed in claim 1, wherein the cyclic ring amino group represented by X is 1-indolinyl, morpholino, 1,2,3,4-tetrahydroquinolin-1-yl, pyrrolidono, benzomorpholino, 1-pyrrolinyl, or 1-piperidinyl.

3. The azomethine compound as claimed in claim 1, wherein X represents 5-membered cyclic ring amino.

4. The azomethine compound as claimed in claim 1, wherein R represents phenyl.

5. The azomethine compound as claimed in claim 1, wherein R represents phenyl having a substituent in the ortho-position.

6. The azomethine compound as claimed in claim 1, wherein Ar represents phenyl whose para-position is substituted by alkyl amino.

7. A dye comprising the azomethine compound as claimed in claim 1.

8. A photographic dye that is used for photography comprising the azomethine compound represented by the following formula:

$$X-\underset{\underset{N-Ar}{\|}}{COCCONH}-R$$

wherein X represents 5- or 6-membered cyclic amino which may be a monocyclic ring or a condensed ring, R represents aromatic, and Ar represents phenyl having in the para-position, alkyl amino having at least one alkyl.

9. The dye as claimed in claim 8, wherein the azomethine compound represented by formula (I) further comprises a nondiffusible group.

10. A heat transfer dye for a heat transfer dye-donating material comprising the dye as claimed in claim 7.

11. The azomethine compound as claimed in claim 6, wherein the substituent for Ar is diethylamino or dimethylamino.

12. The azomethine compound as claimed in claim 6, wherein alkyl amino is alkyl amino having at least one alkyl with 1 to 5 carbon atoms.

13. The azomethine compound as claimed in claim 6, wherein alkyl amino is alkyl amino having two alkyls with 1 to 5 carbon atoms.

14. The azomethine compound as claimed in claim 6, wherein Ar is phenyl whose para-position is substituted by alkyl amino and whose ortho-position is substituted by alkyl having 1 to 5 carbon atoms.

15. The photographic dye as claimed in claim 8, wherein Ar is phenyl whose para-position is substituted by alkyl amino and whose ortho-position is substituted by alkyl having 1 to 5 carbon atoms.

16. The photographic dye as claimed in claim 8, wherein R is phenyl.

17. The azomethine compound as claimed in claim 1, wherein the substituents are selected from the group consisting of fluorine, chlorine, bromine, alkoxycarbonyl having 2 to 30 carbon atoms, carbonoamido having 2 to 30 carbon atoms, sulfonamido having 1 to 30 carbon atoms, carbamoyl having 1 to 30 carbon atoms, sulfamoyl having 1 to 30 carbon atoms, N-sulfonylsulfamoyl having 1 to 30 carbon atoms, alkoxy having 1 to 30 carbon atoms, sulfonyl having 1 to 30 carbon atoms, phenoxy, nitro, cyano, carboxyl, hydroxyl, sulfo, N-carbonosulfamoyl having 2 to 30 carbon atoms, and alkyl which may be a linear or branched, saturated or unsaturated and having 1 to 30 carbon atoms.

18. The azomethine compound as claimed in claim 1, wherein the substituents are selected from the group consisting of fluorine, chlorine, bromine, methoxycarbonyl, dodecyloxycarbonyl, acetamide, tetradecaneamido, methanesulfonamido, dodecanesulfonamido, N-dodecylcarbamoyl, N-phenylsulfamoyl, N-dodecylsulfamoyl, N-mesylsulfamoyl, N-dodecanesulfonylsulfamoyl, methoxy, ethoxy, methanesulfonyl, benzenesulfonyl, dodecanesulfonyl, phenoxy, nitro, cyano, carboxyl, hydroxyl, sulfo, N-propanoylsulfamoyl, tetradecanoylsulfamoyl, methyl, ethyl, t-pentyl, and t-butyl.

19. The azomethine compound as claimed in claim 9, wherein the nondiffusible group is an organic group that makes the molecular weight large enough so that said azomethine compound is immobilized so that it can not diffuse.

20. The azomethine compound as claimed in claim 9, wherein the nondiffusible group is alkyl having a total of 8 to 30 carbon atoms.

21. The azomethine compound as claimed in claim 9, wherein the nondiffusible group is substituted phenyl having 4 to 20 carbon atoms in all.

22. The azomethine compound as claimed in claim 1, wherein said azomethine compound is selected from the group consisting of:

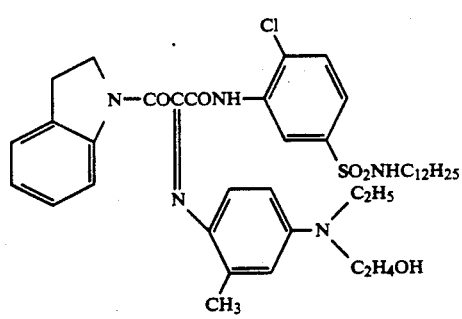

(1)

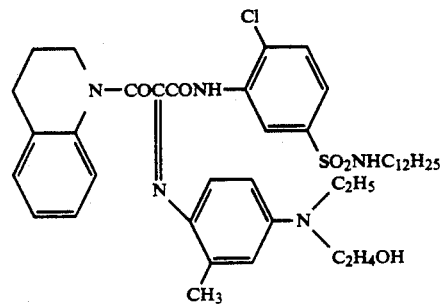

(2)

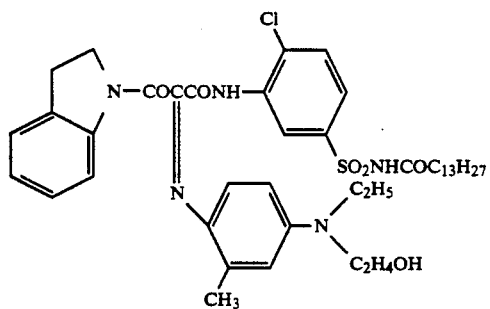
(3)
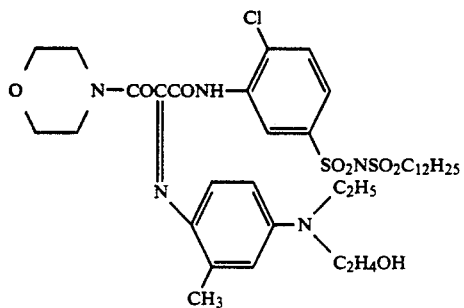
(4)
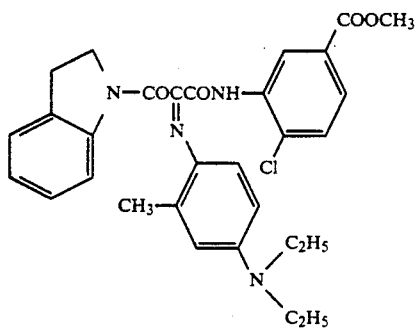
(5)
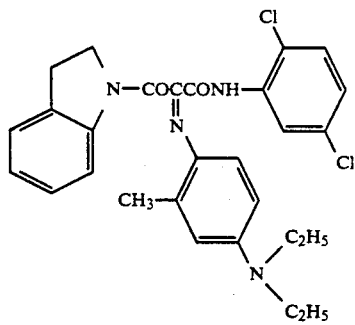
(6)
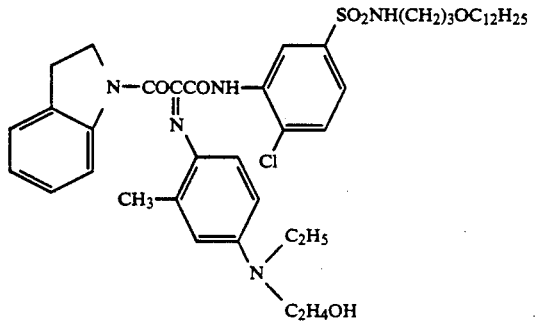
(7)

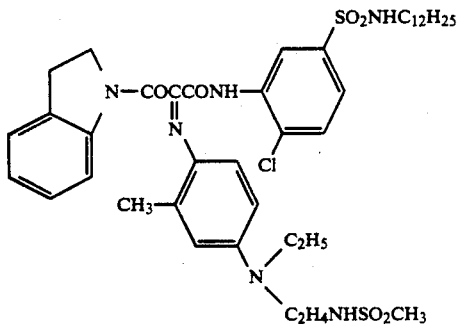 (8)
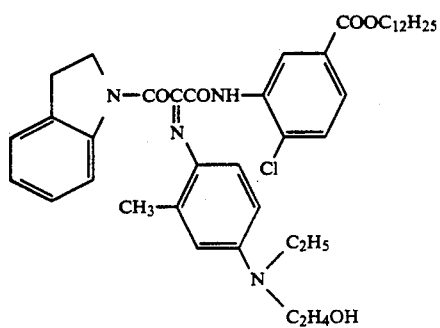 (9)
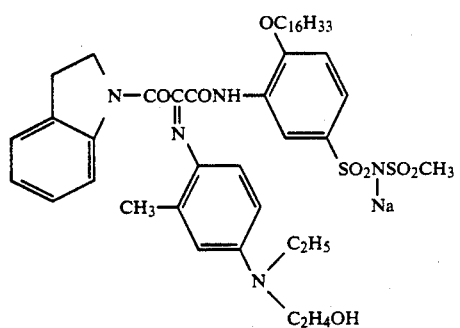 (10)
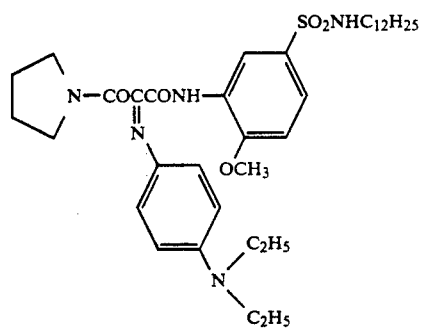 (11)
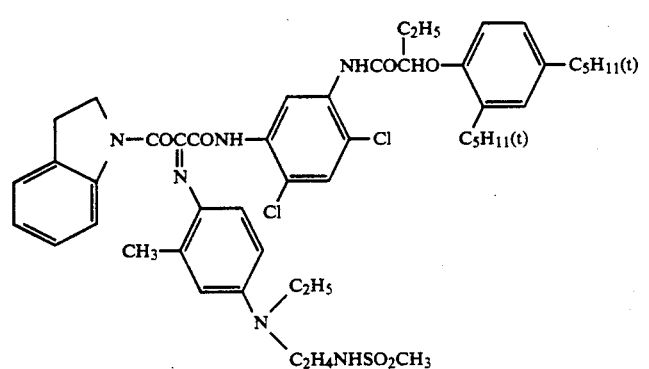 (12)

-continued
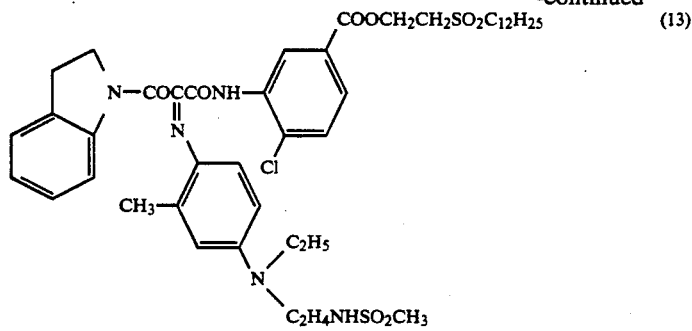 (13)
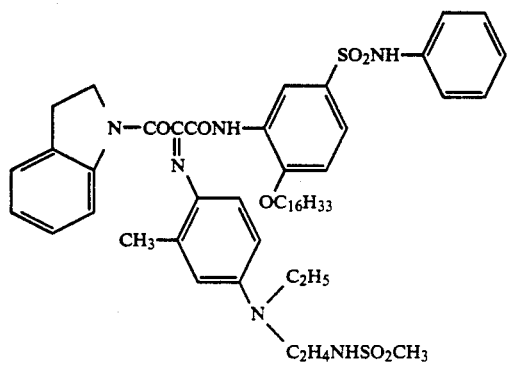 (14)
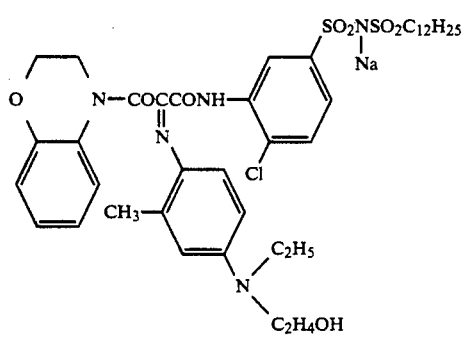 (15)
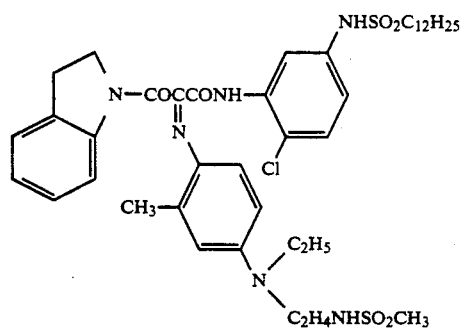 (16)
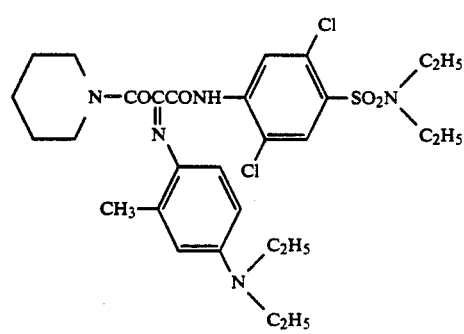 (17)

-continued
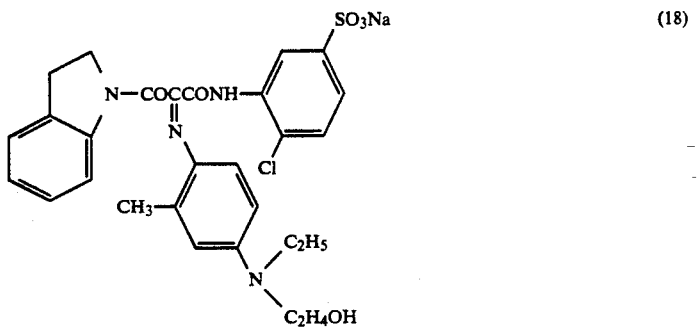 (18)
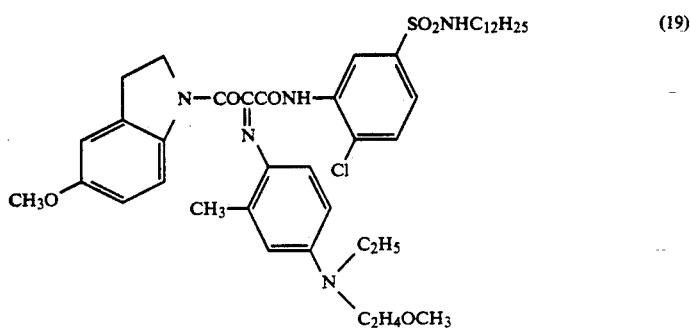 (19)
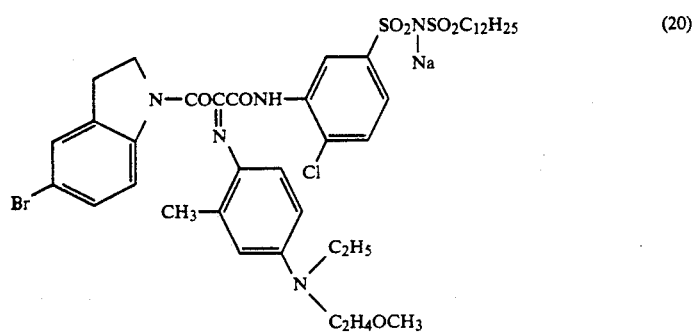 (20)
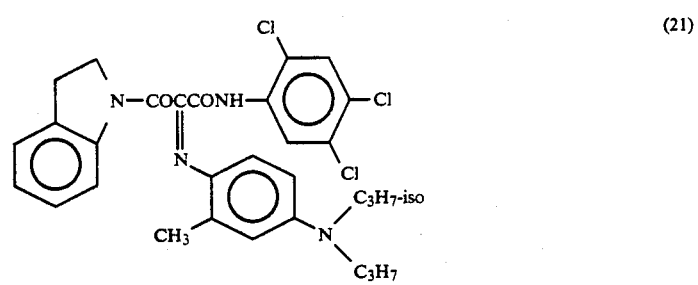 (21)
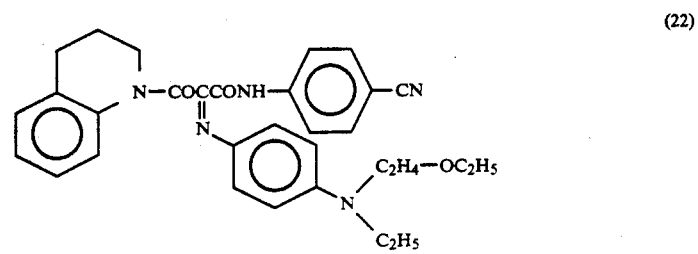 (22)

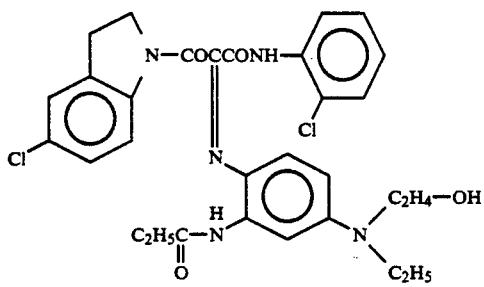
(23)

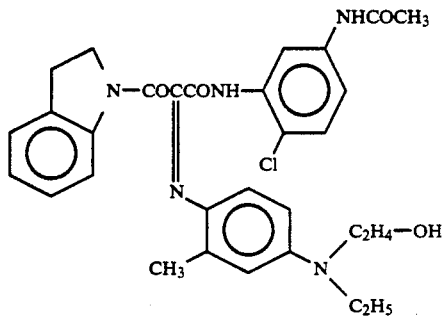
(24)

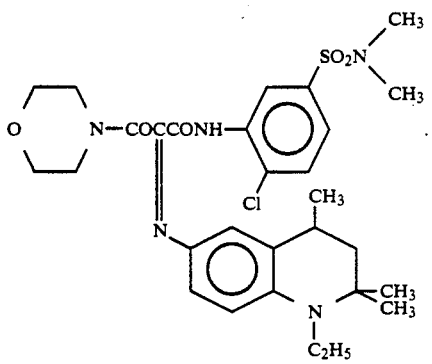
(25)

23. The photographic dye as claimed in claim 8, wherein:
X represents substituted or unsubstituted, saturated or unsaturated, 5- or 6-membered cyclic or condensed ring amino, wherein the members of the ring-constituting atoms are selected from the group consisting of nitrogen atoms, carbon atoms, oxygen atoms, sulfur atoms and combinations thereof,
R represents substituted or unsubstituted phenyl,
Ar represents substituted or unsubstituted phenyl having alkyl amino with 1 to 10 carbon atoms in the para-position, and
the substituents for amino, phenyl, and alkyl are selected from the group consisting of halogen, alkoxycarbonyl, carbonoamido, sulfonamido, carbamoyl, sulfamoyl, N-sulfonylsulfamoyl, alkoxy, sulfonyl, phenoxy, nitro, cyano, carboxyl, hydroxyl, sulfo, N-carbonosulfamoyl and an alkyl group, said substituents are unsubstituted or further substituted with the substituents listed above.

* * * * *